(12) United States Patent
Kwon

(10) Patent No.: US 11,952,147 B2
(45) Date of Patent: Apr. 9, 2024

(54) DRONE STATION

(71) Applicant: NARMA CO. LTD., Daejeon (KR)

(72) Inventor: Kijung Kwon, Daejeon (KR)

(73) Assignee: NARMA CO. LTD., Daejeon (KR)

( * ) Notice: Subject to any disclaimer, the term of this patent is extended or adjusted under 35 U.S.C. 154(b) by 113 days.

(21) Appl. No.: 17/798,184

(22) PCT Filed: Mar. 30, 2021

(86) PCT No.: PCT/KR2021/003898
§ 371 (c)(1),
(2) Date: Aug. 8, 2022

(87) PCT Pub. No.: WO2022/059875
PCT Pub. Date: Mar. 24, 2022

(65) Prior Publication Data
US 2023/0074715 A1    Mar. 9, 2023

(30) Foreign Application Priority Data

Sep. 15, 2020 (KR) .......................... 10-2020-0118460

(51) Int. Cl.
*B64F 1/00* (2006.01)
*B64U 70/92* (2023.01)
*B64C 39/02* (2023.01)

(52) U.S. Cl.
CPC .............. *B64F 1/007* (2013.01); *B64U 70/92* (2023.01); *B64C 39/024* (2013.01); *B64U 2201/20* (2023.01)

(58) Field of Classification Search
CPC ................................ B64F 1/007; B64U 70/92
See application file for complete search history.

(56) References Cited

U.S. PATENT DOCUMENTS 3,081,970 A  *  3/1963  Einarsson ................. B64F 1/26
                                                        89/1.8
3,436,036 A  *  4/1969  Madelung ............... E01C 9/008
                                                        244/114 R
(Continued)

FOREIGN PATENT DOCUMENTS

JP        H05-195515 A       8/1993
JP        H10-306700 A      11/1998
(Continued)

OTHER PUBLICATIONS

International Search Report from corresponding PCT Application No. PCT/KR2021/003898, dated Nov. 2, 2021.

*Primary Examiner* — Jessica B Wong
(74) *Attorney, Agent, or Firm* — Harness, Dickey & Pierce, P.L.C.

(57) ABSTRACT

A drone station according to an embodiment of the present disclosure comprises: a roof allowing a drone to land thereon; a side wall formed to be erected around all sides of the roof from the lower side of the roof; a nozzle which is formed at an edge at which the roof and the side wall meet each other, and sprays an air current upward; a grill formed on the side wall to allow external air to be introduced thereinto; a guide panel disposed inside the grill to guide fluid flow so that fluid flows from the grill to the nozzle; and a rotor disposed inside the guide panel to move fluid from the grill side to the nozzle side through a rotating operation.

6 Claims, 2 Drawing Sheets

(56) References Cited

U.S. PATENT DOCUMENTS

| | | | | |
|---|---|---|---|---|
| 4,541,594 A | * | 9/1985 | Foley | E01C 9/008 |
| | | | | 244/110 E |
| 4,700,912 A | * | 10/1987 | Corbett | B64F 1/00 |
| | | | | 244/114 R |
| 5,407,149 A | * | 4/1995 | Singhai | G01M 9/04 |
| | | | | 73/147 |
| 2021/0032820 A1 | * | 2/2021 | Sarpotdar | B64F 1/26 |

FOREIGN PATENT DOCUMENTS

| KR | 10-2015-0026018 A | 3/2015 |
|---|---|---|
| KR | 10-1647988 B1 | 8/2016 |
| KR | 10-2019-0055925 A | 5/2019 |

* cited by examiner

DRONE STATION

CROSS-REFERENCE TO RELATED APPLICATIONS

This application is a national phase application of PCT Application No. PCT/KR2021/003898, filed on 30 Mar. 2021, which claims the benefit and priority to Korean Patent Application No. 10-2020-0118460, filed 15 Sep. 2020. The entire disclosures of the applications identified in this paragraph are incorporated herein by references.

TECHNICAL FIELD

The present disclosure relates to a drone station enabling drones that can perform vertical takeoff and landing such as rotary-wing drones to land.

BACKGROUND ART

As a drone, there is a rotary-wing drone that achieves a lift by rotating wings. A rotary-wing drone has an advantage that the place for takeoff and landing does not need to be wide in comparison to fixed-wing drones, whereby it is widely used in various industrial fields.

A drone rotates a motor using a battery, so when the remaining capacity of the battery is small, it is required to recharge or replace the battery.

Meanwhile, a place for flying a drone may have a disordered rough configuration, and in this case, a drone station can be used.

A drone station may be a device or a structure provided to landing or taking off a drone. It is possible to recharge or replace a battery or repair a drone for other purposes with the drone landed on a drone station.

However, since the place on which a drone station is disposed is an exposed place, influence by wind may be large, whereby it may be difficult to land a drone at an exact location due to wind when landing the drone on a drone station.

Further, it is possible to equip a ship with a drone station on the sea and operates the drone with the development of the technology of drone, but in this case, landing of a drone may be obstructed by wind blowing around the drone station.

Meanwhile, it is possible to reduce the influence of wind, for example, by physically constructing a tent or walls around a drone station, but in this case, flying of a drone may be obstructed, for example, a drone hits against objects, and there may be a problem that the visual field of a worker is blocked.

DISCLOSURE

Technical Problem

Accordingly, an objective of the present disclosure is to provide a drone station that can block natural wind so that a drone can land an exactly desired location when it is expected that a drone is obstructed from landing due to natural wind blowing around the drone station.

Another objective of the present disclosure is to provide a drone station that can secure the visual field of a user even if influence of wind is decreased.

Technical Solution

In order to achieve the objectives of the present disclosure, a drone station according to an embodiment of the present disclosure includes; a roof (11) on which a drone (100) lands; side walls (12) erected around and under the roof (11); nozzles (18) formed at edges between the roof (11) and the side walls (12) to emit air currents upward; grills (20) formed at the side walls 12 and can enable external air to flow inside; guide panels (32) disposed inside the grills (20) and guiding flow of fluid to flow from the grills (20) to the nozzles (18); and rotors (36) disposed inside the guide panels (32) and moving fluid from the grills (20) to the nozzles (18) by rotating.

Further, the drone station according to an embodiment of the present disclosure may include stabilizers (34) disposed inside the side walls (12) and controlling a flow rate, a flow speed, and a spray direction of fluid, which is moved to the nozzles (18).

Further, in the drone station according to an embodiment of the present disclosure, an external shape of the roof (11) may be provided as a polygonal shape when the roof (11) is seen from above, and the nozzle (18) may be disposed at every edge of the roof (11).

Further, in the drone station according to an embodiment of the present disclosure, the roof (11) may be any one polygonal shape of a rectangle, a hexagon, an octagon, and a dodecagon.

Further, the drone station according to an embodiment of the present disclosure may include: a motor (40) configured to operate the rotor (36); and a controller (C) configured to operate the motor (40) on the basis of an approach signal of the drone (100).

Further, in the drone station according to an embodiment of the present disclosure, the approach signal of the drone (100) may be any one signal of an inherent signal that is generated from the drone (100) and a control signal that is generated in accordance with a drone return signal from a drone remote controller.

The details of other exemplary embodiments are included in the following detailed description and the accompanying drawings.

Advantageous Effects

The drone station having the configuration described above according to an embodiment of the present disclosure forms an air curtain around a landing location and the air curtain can minimize influence on a drone by natural wind, whereby it is possible to stably land a drone at a more exact location.

Further, the drone station having the configuration described above according to an embodiment of the present disclosure forms an air curtain around the drone station, whereby it is possible to secure a visual field of a user, and accordingly, a worker can more safely and securely control a drone.

BEST MODE

Figure 1:
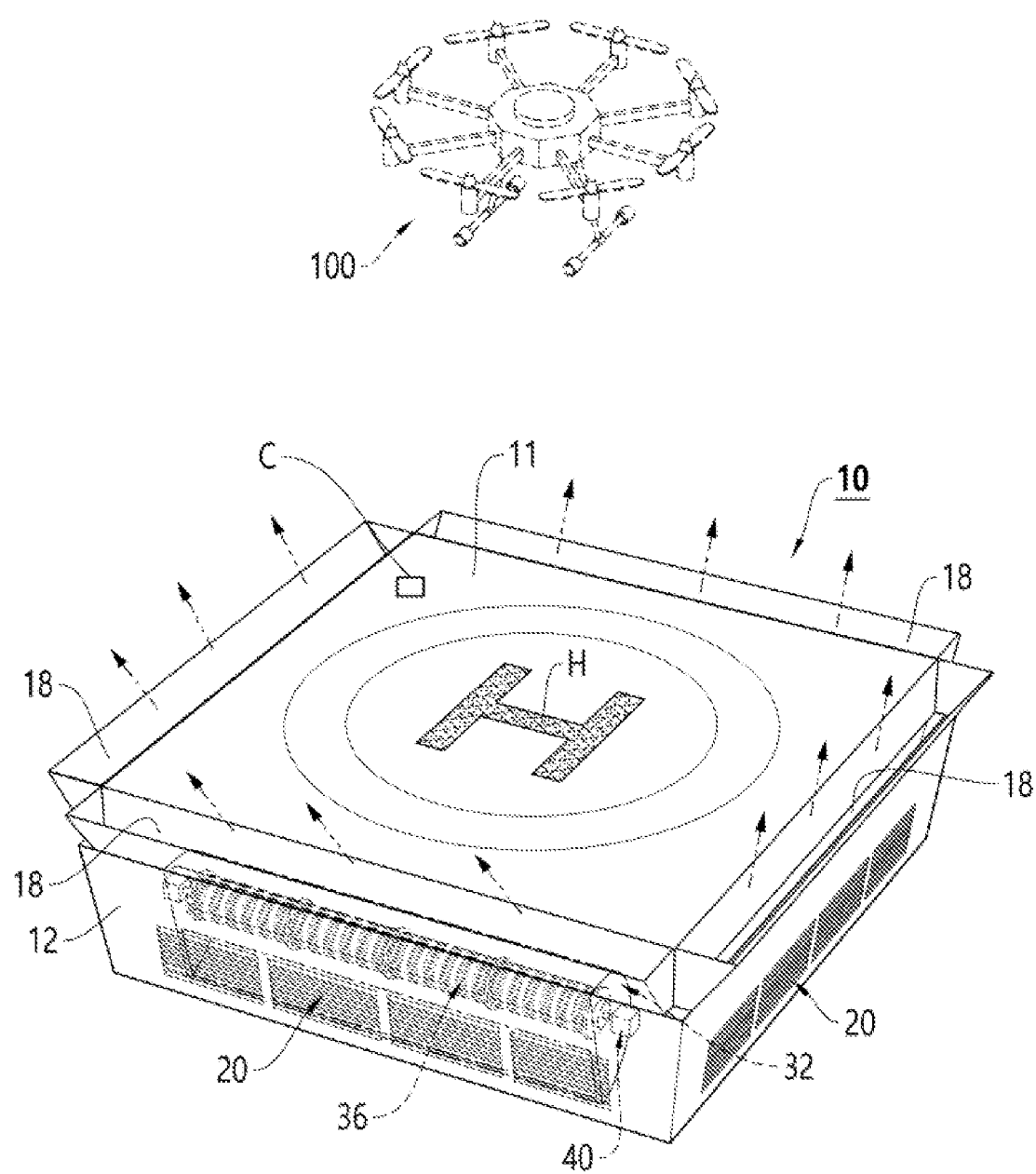
FIG. 1 is a view for describing a drone station according to an embodiment of the present disclosure.

The advantages and features of the present disclosure, and methods of achieving them will be clear by referring to the exemplary embodiments that will be describe hereafter in detail with reference to the accompanying drawings.

Hereinafter, embodiments of the present disclosure will be described in detail with reference to the accompanying drawings. The following embodiments are only example for helping understand the present disclosure and it should be understood that the present disclosure may be modified in various ways different from the embodiments described herein. However, in describing the present disclosure, detailed descriptions and drawings of well-known functions or components relating to the present disclosure will not be provided so as not to obscure the description of the present disclosure with unnecessary details. Further, the sizes of some components are not shown with the actual scales and may be exaggerated in the drawings to help understand the present disclosure.

The terms to be described below are set in consideration of functions in the present disclosure and may be changed in accordance with the intention or usage of manufacturers, so the definition should be based on the entire specification.

Like reference numerals indicate the same components throughout the specification.

Figure 2:
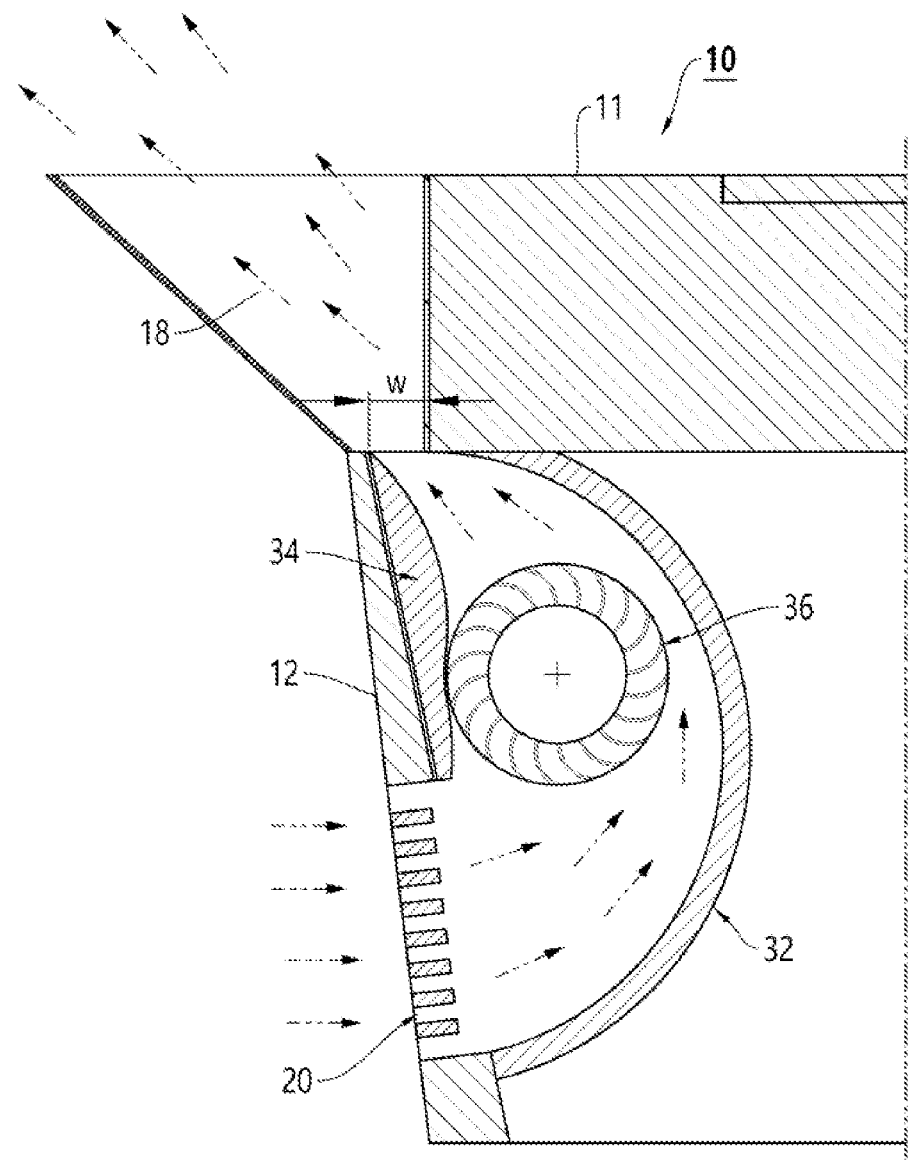
FIG. 2 is a view for describing a configuration for forming an air curtain around the drone station according to an embodiment of the present disclosure.

Hereafter, a drone station according to an embodiment of the present disclosure is described with reference to FIGS. 1 and 2. FIG. 1 is a view for describing a drone station according to an embodiment of the present disclosure. FIG. 2 is a view for describing a configuration for forming an air curtain around the drone station according to an embodiment of the present disclosure.

A drone station according to an embodiment of the present disclosure may include a roof 11, side walls 12, nozzles 18, grills 20, guide panels 32, and rotors 36.

The roof 11 may be provided in a flat shape so that a drone 100 lands thereon, and a landing location H may be marked on the roof 11. The landing location H may be disposed at the center of the roof 11.

Though not shown in the figures, a landing location that can automatically charge a battery of the drone 10 may be connected to the roof 11.

The side walls 12 may be erected on four sides around and under the roof 11.

The nozzles 18 are formed in narrow gap shapes at the edges between the roof 11 and the side walls 12 to emit air currents upward.

The direction of the air currents sprayed from the nozzles 18 may be set to be inclined outward. Accordingly, it is possible to prevent a drone 100 from being rolled in an air curtain.

The grills 20 are formed at the side walls 12 and can enable external air to flow inside.

Meanwhile, the drone station may be disposed on a ship or a rooftop or may be floated in the air, and in this case, the grills 20 may be disposed at a side on the floor of the drone station other than the side walls 12.

The guide panels 32 may be disposed inside the grills 20 and can guide flow of fluid to flow from the grills 20 to the nozzles 18.

The rotors 36 may be disposed inside the guide panels 32 and can move fluid from the grills 20 to the nozzles 18 by rotating.

The rotor 36 may be rotated by a motor 40.

Meanwhile, the grill 20, the guide panel 32, the rotor 36, the motor 30, etc. may be provided to correspond to the number of the nozzles 18.

That is, when the rotor 36 is operated, a strong air current is generated inside the guide panel 32 and can be sprayed upward through the nozzle 18.

Further, it is possible to adjust the intensity of the air current by adjusting the number of revolutions of the rotor 36. The sprayed air current is a jet air current and the flow speed thereof may be high.

Wind is classified into 0~4 levels in accordance with the wind force, in which the level 3 is defined as a gentle breeze with a wind speed of 34~54 (m/s) and the level 4 is defined as a moderate breeze with a wind speed of 55~79 (m/s).

The air currents sprayed through the nozzles 18 are sprayed faster than the level 3 or the level 4, thereby being able to form an air curtain.

That is, the drone station having the configuration described above according to an embodiment of the present disclosure forms an air curtain around the landing location H and the air curtain can minimize influence on a drone by natural wind, whereby it is possible to stably land a drone at a more exact location.

Further, the drone station according to an embodiment of the present disclosure, as described above, forms an air curtain around the drone station, whereby it is possible to secure a visual field of a user, and accordingly, a worker can more safely and securely controlling a drone.

Further, the drone station according to an embodiment of the present disclosure may include stabilizers 34. The stabilizer 34, as shown in FIG. 2, may be disposed opposite to the guide panel with the rotor 36 therebetween, in detail, may be disposed inside the side wall 12.

The stabilizer 34 can control the flow rate, flow speed, and spray direction of fluid, which is moved to the nozzle 18, in accordance with the surface shape. That is, the flow rate, pressure, and speed of fluid can be influenced by variables such as how close the surface of the stabilizer 34 is disposed to the rotor 36 and what curve the surface shape makes. In the stabilizer 34 of an embodiment of the present disclosure, the portion close to the rotor 36 is formed in a shape similar to the rotation radius of the rotor 36 to prevent interference with the rotor 46, the portion close to the grill 20 is formed in a shape that secures a wide space to prevent inflow of fluid from the grill 20, and the portion close to the nozzle 18 is formed in a streamline shape, thereby minimizing resistance of airflow. Accordingly, it is possible to help liquid be able to be discharged at a very high speed.

Meanwhile, the external shape of the roof 11 may be provided in a polygonal shape when the roof 11 is seen from above, and the nozzle 18 may be disposed at every edge of the roof 11.

The space of the nozzle 18 from which fluid is sprayed is narrow and long, so the speed of the air current is very high. As described above, when the roof 11 is formed in a polygonal shape, air currents are emitted from every edge of the roof 11, whereby an air curtain can be formed around the roof 11.

Further, the roof 11 may be any one polygonal shape of a rectangle, a hexagon, an octagon, and a dodecagon.

Further, when the larger the scale of the drone station, the larger the distance and area of the air curtain should be. The length of the rotor 36 is influenced by the performance of the motor 40, setting of the length of the rotor 3 is unavoidably limited. By disposing the standardized rotor 36 at each edge of the roof 11, it is possible to prevent a blank space in the air curtain.

Meanwhile, when the roof 11 is provided in a polygonal shape, the roof 11 can be designed with a large area when the scale of a drone is large, and in this case, it is possible to a blank space in the air curtain by disposing a plurality of rotors 36 and motors 40 at one edge of the roof 11.

Meanwhile, the drone station according to an embodiment of the present disclosure can automatically implement an air curtain at a specific point in time by including a controller C. The controller C can operate the motor 40 on the basis of an approach signal of the drone 100. Further, the controller C includes a communication unit, thereby being able to receive the approach signal in a wired or wireless type.

That is, when the drone 100 approaches the drone station, the motor 40 is operated and the rotor 36 is operated by the motor 40, whereby a jet current is formed through the nozzle 18 and accordingly an air curtain can be implemented.

The approach signal may be an inherent signal that is generated from the drone 100. An inherent signal that enables each drone 100 to be identified can be continuously generated, and a drone operator can input an inherent signal of a drone 100 that he/she operates into the control unit C in advance. Accordingly, when a drone operator lands a drone 100, an air curtain can be implemented when the drone 100 approaches the drone station even though the drone operator performs a specific operation for forming the air curtain.

Further, the approach signal may be a control signal that is generated in accordance with a drone return order from a drone remote controller. The drone 100 has a function of returning to the original location. That is, when a drone operator returns a drone, he/she can give an original location return order and the controller C can receive a control signal according to the original location return order and operate the motor 40.

That is, the drone station according to an embodiment of the present disclosure can implement an air curtain in accordance with any one signal of an inherent signal of a drone 100 and a control signal in accordance with a return order of the drone through the controller C.

Meanwhile, the intensity of the approach signal may depend on the distance between the drone 100 and the drone station and the drone 100 can send out an inherent signal including location information. That is, the drone station can estimate a distance and a direction, that is, what direction the drone 100 is positioned in and how far the drone 100 is positioned. Accordingly, the drone station according to an embodiment of the present disclosure can locate the drone 100 on the basis of distance information and direction information of the drone 100.

The drone station according to an embodiment of the present disclosure can control the motor 40 to stop when the drone 100 is positioned or is expected to be positioned within a range that the air curtain influences in order to prevent the drone 100 from being rolled in the air curtain when the air curtain is implemented.

Although an exemplary embodiment of the present disclosure was described above with reference to the accompanying drawings, those skilled in the art would understand that the present disclosure may be implemented in various ways without changing the necessary features or the spirit of the prevent disclosure.

Therefore, it should be understood that the embodiment described above is not limitative, but only an example in all respects, the scope of the present disclosure is expressed by claims described below, not the detailed description, and it should be construed that all of changes and modifications achieved from the meanings and scope of claims and equivalent concept are included in the scope of the present disclosure.

Industrial Applicability

The drone station according to an embodiment of the present disclosure can be used to land a drone.

What is claimed is:

1. A drone station comprising:
   a roof on which a drone lands;
   side walls erected around and under the roof defining an inside area;
   nozzles formed at edges between the roof and the side walls to emit air currents upward;
   grills formed at the side walls that enable external air to flow into the inside area;
   guide panels disposed within the inside area and guiding flow of fluid to flow from the grills to the nozzles; and
   rotors disposed inside the guide panels and moving fluid from the grills to the nozzles by rotating.

2. The drone station of claim 1, comprising stabilizers disposed inside the side walls and controlling a flow rate, a flow speed, and a spray direction of fluid, which is moved to the nozzles.

3. The drone station of claim 1, wherein an external shape of the roof is provided as a polygonal shape when the roof is seen from above, and the nozzle is disposed at every edge of the roof.

4. The drone station of claim 3, wherein the roof is any one polygonal shape of a rectangle, a hexagon, an octagon, and a dodecagon.

5. The drone station of claim 1, comprising:
   a motor configured to operate the rotor; and
   a controller configured to operate the motor on the basis of an approach signal of the drone.

6. The drone station of claim 4, wherein the approach signal of the drone is any one signal of an inherent signal that is generated from the drone and a control signal that is generated in accordance with a drone return signal from a drone remote controller.

* * * * *